United States Patent
Liu et al.

(10) Patent No.: US 10,735,157 B2
(45) Date of Patent: Aug. 4, 2020

(54) UE-ASSISTED SRS RESOURCE ALLOCATION

(71) Applicant: Futurewei Technologies, Inc., Plano, TX (US)

(72) Inventors: Bin Liu, San Diego, CA (US); Pengfei Xia, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/717,531

(22) Filed: Sep. 27, 2017

(65) Prior Publication Data

US 2018/0227094 A1 Aug. 9, 2018

Related U.S. Application Data

(60) Provisional application No. 62/454,588, filed on Feb. 3, 2017, provisional application No. 62/506,158, filed on May 15, 2017.

(51) Int. Cl.
  *H04W 4/00* (2018.01)
  *H04L 5/00* (2006.01)
  (Continued)

(52) U.S. Cl.
  CPC .......... *H04L 5/0048* (2013.01); *H04L 5/0025* (2013.01); *H04L 5/0094* (2013.01);
  (Continued)

(58) Field of Classification Search
  CPC .. H04L 5/0048; H04W 16/28; H04W 72/046; H04B 7/0404; H04B 7/043; H04B 7/088
  See application file for complete search history.

(56) References Cited

U.S. PATENT DOCUMENTS

2013/0217404 A1   8/2013  Jung
2013/0235742 A1*  9/2013  Josiam ................. H04W 24/10
                                                   370/252
(Continued)

FOREIGN PATENT DOCUMENTS

WO    2014133311 A1    9/2014
WO    2015080645 A1    6/2015
WO    2015199603 A1   12/2015

OTHER PUBLICATIONS

3GPP TR 38.802 V14.0.0, 3rd Generation Partnership Project; Technical Specification Group Radio Access Network; Study on New Radio Access Technology Physical Layer Aspects (Release 14), Mar. 2017, 143 pages.

*Primary Examiner* — Barry W Taylor
(74) *Attorney, Agent, or Firm* — Slater Matsil, LLP

(57) ABSTRACT

A dynamic UE capability message specifying a number of beams to be evaluated within different groups of UE TX beam directions associated with different antenna arrays of a UE may be communicated to a transmit receive point (TRP). Each group of UE TX beam directions may include beam directions that are candidates for uplink data transmission. Based on information in the dynamic UE capability message, the TRP can assign SRS resources (for uplink beam management or uplink channel sounding) and/or schedule a multi-layer MIMO uplink transmission in accordance with a UE capability constraint. This may ensure that the SRS resources assignment and/or scheduled multi-layer MIMO uplink transmission is consistent with the UE's beamforming capabilities.

12 Claims, 8 Drawing Sheets

(51) Int. Cl.
*H04W 72/04* (2009.01)
*H04W 16/28* (2009.01)
*H04B 7/06* (2006.01)
*H04B 7/08* (2006.01)

(52) U.S. Cl.
CPC ......... *H04W 72/046* (2013.01); *H04B 7/0695* (2013.01); *H04B 7/088* (2013.01); *H04W 16/28* (2013.01)

(56) References Cited

U.S. PATENT DOCUMENTS

| | | | |
|---|---|---|---|
| 2013/0301454 A1* | 11/2013 | Seol | H04B 7/043 |
| | | | 370/252 |
| 2014/0185481 A1 | 7/2014 | Seol et al. | |
| 2015/0004918 A1 | 1/2015 | Wang et al. | |
| 2016/0337916 A1* | 11/2016 | Deenoo | H04W 8/22 |
| 2018/0048358 A1* | 2/2018 | Li | H04B 7/0404 |
| 2018/0102827 A1* | 4/2018 | Noh | H04B 7/0452 |
| 2018/0103492 A1* | 4/2018 | Akkarakaran | H04W 72/00 |
| 2018/0132114 A1* | 5/2018 | Sun | H04W 16/28 |
| 2018/0205440 A1* | 7/2018 | Enescu | H04B 7/0695 |
| 2018/0269949 A1* | 9/2018 | Kim | H04B 7/04 |
| 2018/0323845 A1* | 11/2018 | Chang | H04B 7/0695 |
| 2019/0081673 A1* | 3/2019 | Athley | H04B 7/0617 |

* cited by examiner

UE-ASSISTED SRS RESOURCE ALLOCATION

This application claims priority to U.S. Provisional Patent Application 62/454,588 filed on Feb. 3, 2017 and entitled "Method and Apparatus for Uplink Beam Management in Beam Based Access System" and to U.S. Provisional Patent Application 62/506,158 filed on May 15, 2017 and entitled "UE-Assisted SRS Resource Allocation," both of which are incorporated herein by reference as if reproduced in their entirety.

TECHNICAL FIELD

The present specification relates generally to telecommunications, and in particular embodiments, to methods for UE-assisted SRS resource allocation for beam management and uplink channel sounding.

BACKGROUND

Wireless signals communicated at high carrier frequencies, such as millimeter Wave (mmW) signals, tend to exhibit high free-space path loss. To compensate for high path loss rates, high-frequency communications may use beamforming at both the transmit/receive point (TRP) and user equipment (UE). Beam management techniques may be used to identify, or otherwise discover, beam directions to use for initial data transmission/reception, as well as to adapt, or otherwise update, beam directions as the spatial characteristics of the air interface change due to, for example, UE mobility.

SUMMARY

Technical advantages are generally achieved by embodiments of this disclosure which describe systems and methods for UE-assisted SRS resource allocation for beam management and uplink channel sounding.

In accordance with an embodiment, a method for beamformed transmissions is provided. In this embodiment, the method comprises receiving downlink reference signals from a transmit receive point (TRP) over a first set of UE receive beams via an antenna array, and electing, from a first set of UE transmit beams, a first group of UE transmit beams which correspond to UE receive beams, in the first set of UE receive beams, having the highest received signal quality or received signal power level. The method further includes transmitting a dynamic UE capability message to the TRP. The dynamic UE capability message specifies a number of UE transmit beams in the first group of UE transmit beams. In one example, each UE transmit beam in the first set of UE transmit beams is associated with the same UE antenna panel. In such an example, or in another example, the first set of UE receive beams and the first set of UE transmit beams are analog beams, and at least one of the analog beams is associated with multiple digital antenna ports. In any of the above-mentioned examples, or in another example, the dynamic UE capability message further specifies a beam index for each UE transmit beam in the group of UE transmit beams. In such an example, the beam index may be a channel state information (CSI) reference signal (CSI-RS) resource identifier (CRI). The dynamic UE capability message may further include beam quality indications associated with the beam indices specified by the dynamic UE capability message. For instance, the beam quality indications in the dynamic UE capability message may comprise reference signal received power (RSRP) indications, reference signal received quality (RSRQ) indications, and/or signal-to-interference-plus-noise ratio (SINR) indications. In any of the above-mentioned examples, or in another example, the dynamic UE capability message requests that a specific set of sounding reference symbol (SRS) resources be assigned to the first group of UE transmit beams for SRS transmission. In any of the above-mentioned examples, or in another example, the dynamic UE capability message further specifies a number of UE transmit beams in the first group of UE transmit beams that can be used for simultaneous transmission. In any of the above-mentioned examples, or in another example, the UE dynamic capability message associates a TRP TX beam with an index associated with a UE RX beam or UE RX beam group. An apparatus for performing this method is also provided.

In accordance with another embodiment, a method for assigning resources is provided. In this embodiment, the method includes receiving a dynamic user equipment (UE) capability message from a UE that specifies one or more groups of UE transmit beams, and assigning sounding reference symbol (SRS) resources to UE transmit beams in the one or more groups of UE transmit beams according to a UE capability constraint. The UE capability constraint restricts the number of UE transmit beams, within a given group of UE transmit beams, that can be used for simultaneous SRS transmissions. The method further includes transmitting a first downlink control signal to the UE that indicates the SRS resource assignments. In one example, the TRP transmits an indication of a TRP beam that is associated with an SRS resource assignment. In the same example, or another example, each group of UE transmit beams is associated with a specific antenna array of the UE. In any of the above-mentioned examples, or in another example, the UE dynamic message further specifies a number of UE TX beams within each UE transmit beam group. In any of the above-mentioned examples, or in another example, the UE dynamic message associates a TRP TX beam with an index associated with a UE RX beam or UE RX beam group. In any of the above-mentioned examples, or in another example, the UE dynamic message the dynamic UE capability message further specifies a number of UE transmit beams in the given group of UE transmit beams that can be used for simultaneous transmission. In any of the above-mentioned examples, or in another example, the dynamic UE constraint requires that UE transmit beams in a given group of UE transmit beams is transmitted over different time-domain resources such that SRS transmissions over different UE transmit beams in the same group of UE transmit beams are time division multiplexed with one another.

In such an example, the first downlink control signal may assign a different set of SRS resources to each group of UE transmit beams without assigning specific SRS resources to individual UE transmit beams, and SRS resources in a given set of SRS resources may be orthogonal with one another in the time domain. For instance, the first downlink control signal may assign at least a first set of SRS resources to a first group of UE transmit beams and a second set of SRS resources to a second group of UE transmit beams, where at least one SRS resource in the first set of SRS resources is non-orthogonal in the time domain with at least one SRS resource in the second set of SRS resources. In such an instance, the at least one SRS resource in the first set of SRS resources may be frequency division multiplexed with the at least one SRS resource in the second set of SRS resources. Alternatively, the at least one SRS resource in the first set of SRS resources may be code division multiplexed with the at least one SRS resource in the second set of SRS resources. Additionally or alternatively, the method may further include detecting SRS transmissions from the UE over one or more SRS resources in the first set of SRS resources and one or more SRS resources in the second set of SRS resources, where the SRS transmissions received over the SRS resources in both the first set of SRS resources and the second set of SRS resources have identical sequences of encoded bits such that the SRS transmissions cannot be distinguished from one another based on information obtained from decoding the SRS transmissions. The method may further include determining that SRS transmissions received over SRS resources in the first set of SRS resources are associated with UE transmit beams in the first group of UE transmit beams and that SRS transmissions received over SRS resources in the second set of SRS resources are associated with UE transmit beams in the second group of UE transmit beams. An apparatus for performing this method is also provided.

In accordance with yet another embodiment, a method for beam management is provided. In this example, the method includes receiving a dynamic user equipment (UE) capability message from a UE. The dynamic UE capability message specifies at least a first group of UE transmit beams and a second group of UE transmit beams, where the first group of UE transmit beams and the second group of UE transmit beams are associated with different antenna arrays or different transmit receive (TX/RX) chains of the UE. The method further includes transmitting a first downlink control signal to the UE that indicates that a common set of sounding reference symbol (SRS) resources have been assigned to the first group of UE transmit beams and the second group of UE transmit beams. The first downlink control signal further indicates that a first SRS sequence has been assigned to the first group of UE transmit beams, and that a second SRS sequence has been assigned to the second group of UE transmit beams. The first SRS sequence being different than the second SRS sequence. The method further includes detecting SRS transmissions from the UE over SRS resources in the common set of SRS resources, and determining that SRS transmissions carrying the first SRS sequence are associated with UE transmit beams in the first group of UE transmit beams and that SRS transmissions carrying the second SRS sequence are associated with UE transmit beams in the second group of UE transmit beams. An apparatus for performing this method is also provided.

In accordance with yet another embodiment, yet another method for beam management is provided. In this example, the method includes receiving a dynamic user equipment (UE) capability message from a UE that specifies one or more groups of UE transmit beams and at least a second UE transmit beams excluded from the group of UE transmit beams, and scheduling a multiple layer multiple input multiple output (MIMO) uplink transmission of the UE according to a UE capability constraint. The UE capability constraint restricts the number of UE transmit beams, within the same group of UE transmit beams, that can be scheduled to the same multiple layer MIMO uplink transmission of the UE. The method further includes transmitting a downlink control signal to the UE, the downlink control signal indicating the scheduled multiple layer MIMO uplink transmission. In one example, the dynamic UE capability message further specifies a number of UE transmit beams in the first group of UE transmit beams that can be used for simultaneous transmission. An apparatus for performing this method is also provided.

In accordance with yet another embodiment, yet another method for beam management is provided. In this embodiment, the method includes receiving an uplink control message from a user equipment (UE) that indicates whether the UE has beam correspondence, and allocating, by a TRP, uplink resources for beamformed reference signal transmissions of the UE. The TRP allocates a single uplink resource per TRP beam for the beamformed reference signal transmissions of the UE when the UE has beam correspondence. The TRP allocates multiple uplink resources per TRP beam for the beamformed reference signal transmissions of the UE when the UE does not have beam correspondence. The method further includes transmitting, by the TRP, a control message to the UE indicating the uplink resources allocated for the beamformed reference signal transmissions by the UE. In one example, the control message contains an indication of TRP TX beam, which is associated with the allocated uplink resources. An apparatus for performing this method is also provided.

In accordance with yet another embodiment, a method for uplink beam management is provided. In this embodiment, the method includes transmitting an uplink control message that indicates whether a UE has beam correspondence, transmitting a recommended number of uplink resource to be allocated for each UE reported TRP TX beam for uplink beam management, and receiving a control message from the TRP that indicates which uplink resources have been allocated for the beamformed reference signal transmissions by the UE. An apparatus for performing this method is also provided.

BRIEF DESCRIPTION OF THE DRAWINGS

For a more complete understanding of the present specification, and the advantages thereof, reference is now made to the following descriptions taken in conjunction with the accompanying drawings, in which.

DETAILED DESCRIPTION OF ILLUSTRATIVE EMBODIMENTS

Figure 1:
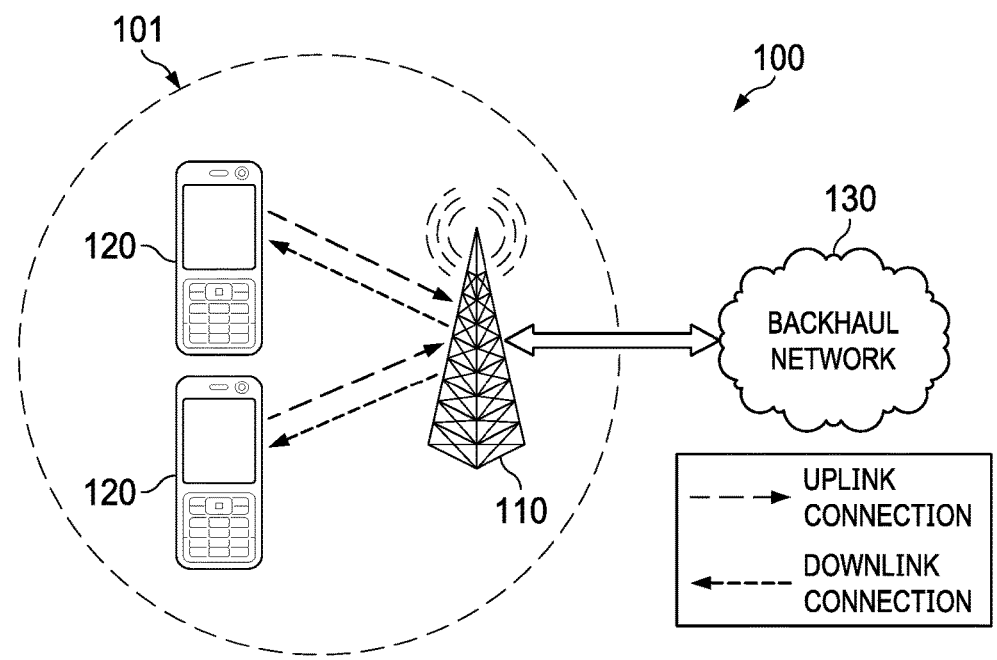
FIG. 1 is a diagram of an embodiment wireless communications network.

The structure, manufacture and use of embodiments are discussed in detail below. It should be appreciated, however, that this disclosure provides many applicable inventive concepts that can be embodied in a wide variety of specific contexts. The specific embodiments discussed are merely illustrative of specific ways to make and use the embodiments, and do not limit the scope of the embodiments. As used herein, the term "beam direction" refers to a radio antenna pattern, or set of beamforming weights, that is used for directional signal transmission and/or reception. The terms "beam directions" and "beams" are used interchangeably herein. A beam direction that is used by a UE to receive a signal is generally referred to as a "UE receive (RX) beam" or "UE RX beam direction," and a beam direction that is used by a UE to transmit a signal is generally referred to as a "UE transmit (TX) beam" or "UE TX beam direction." The term "SRS resource" may refer to a time-domain, frequency-domain resource, a code-domain resource, or a combination thereof (e.g., a time-frequency resource, etc.). In one example, an SRS resource refers to an "antenna port," which maps to a pattern of resource elements in a shared channel. Other examples are also possible.

In fourth generation (4G) Long Term Evolution (LTE) networks, beamforming is typically performed in the digital domain. In fifth generation (5G) wireless networks, it is likely that beamforming will also be performed in the analog domain in order to achieve sufficient antenna gain to meet performance objectives of next-generation wireless standards. Beamforming is achieved in the analog domain by adjusting the phase of signal components on each of the antenna paths between the antenna elements and the analog to digital converter.

With digital beamforming, a beam direction used by a device to transmit a signal will generally offer similar levels of spatial performance when used by the device to receive a signal due to spatial reciprocity. However, with analog beamforming, non-ideal performance characteristics of analog beamforming components may cause the transmit (TX) and receive (RX) antenna patterns of a given beam direction to differ from one another when the UE lacks "beam correspondence." As used herein, a UE is considered to have "beam correspondence" when the UE's TX and RX antennas are sufficiently calibrated such that a common set of analog beamforming weights produce TX and RX antenna patterns within a specified tolerance.

When a UE lacks beam correspondence, uplink beam-management techniques may be needed to determine which uplink TX beam direction(s) to use for data transmission. In particular, a UE may initially communicate a static UE capability message to a TRP that specifies various beam-forming parameters/capabilities of the UE, such as a number of antenna panels/arrays available to the UE, a total number of TX/RX chains available to the UE, a number of TX/RX chains per antenna panel/array, a number of concurrent analog beam directions that can be formed for each panel, and/or a number of digital ports (e.g., digital antenna ports) that are supported by each analog beam, as well as UE beam correspondence capability.

The TRP may then communicate downlink reference signals to the UE. The UE may receive the reference signal using different UE RX beam directions, and select UE TX beam directions that correspond to UE RX beam directions offering the highest received signal quality or received signal power level. The UE may then notify the TRP of the selected TRP TX beam directions, and the TRP may assign sounding reference symbol (SRS) resources to the UE for uplink beam management. UE may also indicate number of SRS resources needed for uplink beam management for each selected TRP TX beam. TRP may also schedule one or more of the UE TX beam directions to a multi-layer MIMO uplink transmissions.

When TRP assigns SRS resource to a UE, the SRS resource may or may not be associated with TRP TX beam indices or other equivalent TRP TX beam indicator. In one embodiment, TRP assigns SRS resources and associated TRP TX beam index or other equivalent TRP TX beam indicator, e.g., CSI-RS resource index or SS block index. The TRP TX beam index may indicate corresponding UE TX beams to be used for SRS transmission based on downlink beam management. It is noted that for all following discussion, when TRP assigns SRS resources to a UE, it may or may not indicate an associated TRP TX beam index or other equivalent TRP TX beam indicator.

The number of UE TX beam directions that can be simultaneously used to transmit signals over a given antenna array may depend on the number of TX/RX chains connected to the antenna array. As an example, if a single TX/RX chain is coupled to a given antenna array, then only one UE TX beam direction may be used to transmit signals over the antenna array during a given time interval. As another example, if two TX/RX chains are coupled to a given antenna array, then two UE TX beam direction may be used to transmit signals over the antenna array during a given time interval. Accordingly, if a TRP is not aware of UE TX beam directions are associated with which antenna arrays, then the TRP may assign SRS resources and/or schedule multi-layer MIMO uplink transmissions in a manner that is inconsistent with the UE's beamforming capabilities.

Aspects of this disclosure address this issue by communicating a dynamic UE capability message to a TRP that specifies a number of beams to be evaluated within different groups of UE TX beam directions associated with different antenna arrays. Each group of UE TX beam directions includes one or more beam directions that are candidates for uplink data transmission. Based on information in the dynamic and static UE capability messages, the TRP can assign SRS resources (for uplink beam management or uplink channel sounding) and/or schedule a multi-layer MIMO uplink transmission in accordance with a UE capability constraint such that the SRS resources assignment and/or scheduled multi-layer MIMO uplink transmission is consistent with the UE's beamforming capabilities. In one embodiment, the dynamic UE capability message specifies a number of beam directions in a given group associated with a TRP TX beam. Together with static UE capability message, which indicates maximum simultaneous TX beam can be transmitted by the UE, this may allow the TRP to determine how many time division multiplexed SRS resources need to be assigned to the group for purposes of uplink beam management. In another embodiment, the dynamic UE capability message specifies number of TX beams to be swept by a UE for uplink beam management. The number of beams is according to the beam correspondence status in UE. In another embodiment, the dynamic UE capability message specifies indices of UE TX beam directions in a given group. This may allow the TRP to determine how to multiplex signals transmitted over various UE TX beam directions.

As mentioned above, the TRP may assign SRS resources and/or schedule a multi-layer MIMO uplink transmission in accordance with a UE capability constraint. The UE capability constraint may ensure that SRS resources and multi-layer MIMO uplink transmissions are assigned/scheduled in a manner that is consistent with the UE's beamforming capabilities. In one embodiment, the UE capability constraint restricts the number of UE TX beam directions, within a given group, that can be used for simultaneous SRS transmissions. For instance, if a single TX/RX chain is connected to an antenna array of a UE, then the UE capability constraint may require that different UE TX beam directions in a corresponding group be assigned SRS resources that are orthogonal in the time domain such the SRS transmissions over different UE TX beam directions in the group are time division multiplexed with one another. In another embodiment, the UE capability constraint restricts the number of UE TX beam directions, within a given group, that can be scheduled to the same multi-layer MIMO uplink transmission. By way of example, if a single TX/RX chain is connected to a given antenna array of a UE, then the UE capability constraint may prevent multiple UE TX beam directions, in the corresponding group, from being scheduled to the same multi-layer MIMO uplink transmission.

The maximum number of UE TX beam directions, within a given group, that can be used for simultaneous SRS transmissions or otherwise scheduled to the same multi-layer MIMO uplink transmission may be a priori information of the TRP. Alternatively, the maximum number of UE TX beam directions, within a given group, that can be used for simultaneous SRS transmissions or otherwise scheduled to the same multi-layer MIMO uplink transmission may be specified by a static UE capability message. Furthermore, the selected number of UE TX beam directions, within a given group, for uplink transmission is a dynamic UE capability message.

In some embodiments, a TRP may identify which SRS transmissions correspond to a specific UE TX beam direction, or a specific group of UE TX beam directions, based on the resources over which the SRS transmissions are received or based on a SRS sequence carried by the SRS transmissions. In particular, when a TRP assigns SRS resources to specific UE TX beam directions, the TRP may identify which UE TX beam direction was used to transmit a received SRS transmission based on the resource over which the SRS transmissions was received. Likewise, when a TRP assigns a set of SRS resources to a specific group of UE TX beam directions, the TRP may identify which group of UE TX beam directions corresponds to a received SRS transmission based on the resource over which the SRS transmission was received. Alternatively, when a TRP assigns different SRS sequences to different groups of UE TX beam directions, the TRP may identify which group of UE TX beam directions corresponds to a received SRS transmission based on the SRS sequence carried by the SRS transmission.

In some embodiments, a downlink beam report of a UE may include associated a selected TRP downlink beam with UE RX beam information (e.g., an index of a selected UE RX beam, a UE beam group index associated with a selected UE beam group, a UE beam group that includes a selected UE RX beam, or a UE beam group associated with a UE antenna panel, etc.). In one example, the downlink beam report associates each TRP TX beam identified by the downlink beam report with a UE antenna panel that was used to receive the reference signal corresponding to the TRP TX beam. If the UE static capability is already known to the TRP, then the TRP can use the UE RX beam information to allocate SRS resources for uplink beam management and/or to schedule a multi-layer MIMO uplink transmission in accordance with a UE capability constraint. This may ensure that the SRS resources and/or multi-layer MIMO uplink transmissions are assigned/scheduled in a manner that is consistent with the UE's beamforming capabilities.

Embodiments of this disclosure provide a unified beam management scheme that can be applied irrespective of whether a UE's TX and RX beams are calibrated, or in another word whether UE has beam correspondence. In one embodiment, the UE sends a control message TRP notifying the TRP whether the UE has beam correspondence. The control message may be a random access message (e.g., a physical random access channel message #3), and may indicate UE capabilities, such as the UE's analog beamforming capabilities, a number of RF chains in the UE's transceiver, a number of antennas/beams that the UE is capable of using to transmit or receive wireless signals, beam correspondence, and/or a calibration status of each RF chain. The message may also specify quality/measurement information corresponding to downlink signals received by the UE using various receive (Rx) beams. The downlink signals may have been transmitted by the TRP using different transmit (Tx) beams, and the control message communicated by the UE to the TRP may specify an index or identifier of the downlink signal and/or the corresponding TX beam. In some embodiments, the UE may report information about TRP TX beam on a per UE antenna group basis. Upon receiving the UE's control message, the TRP determines whether UE has beam correspondence, and assigns time/frequency resources for uplink beamformed reference signals based on the information received from the UE. The uplink beamformed reference signals may be physical random access channel (PRACH) reference signal transmissions, sounding reference signal (SRS) transmissions, and/or uplink (UL) demodulation reference signal (DMRS) transmissions. Other examples are also possible.

Allocated uplink resources may be paired with a downlink beam index or other equivalent indicator. Reference signals may be sent by UE based on UE beam correspondence. The TRP may communicate these beamforming management configuration parameters to the UE in a downlink control channel. After receiving the downlink control channel from the TRP, the UE may transmit an uplink (UL) beamformed reference signals according to beam management configuration parameters in the downlink control channel. The TRP may receive one or more of the UL beamformed reference signals, and send indications in a control channel to the UE that indicates one or more beams the UE should use when transmitting an uplink data channel. The control signal could identify the beams via an index, such as an SRS sequence index or a DMRS port index.

If the UE has beam correspondence, the TRP may instruct the UE to transmit the uplink reference signals using a single TX beam corresponding to one TRP downlink beam. If the UE doesn't have beam correspondence, the TRP may instruct the UE to transmit the uplink reference signals using one or more TX beams corresponding to one TRP downlink beam.

Embodiments of this disclosure provide uplink beam management schemes for use during initial access. For example, a UE may perform a 2-step or 4-step random access channel (RACH) transmission protocol. During the RACH transmission protocol, the UE may send a message (e.g., PRACH message #3) to the TRP indicating a UE beam correspondence status and/or other UE related information. The UE may also reports TRP TX beam related information based on downlink signal measurements/beam detection.

The TRP TX beam related information can be sent to TRP in PRACH Msg3 or PUCCH message. The TRP may determine uplink beam management configuration parameters for the UE, and send the uplink beam management configuration parameters to the UE via a layer one (L1) or layer two (L2) control signal. For example, the TRP may select a set of UE-specific PRACH preambles, and schedule one or more time frequency resources for sending the UE-specific PRACH preambles. In one embodiment, the TRP may schedule one uplink time frequency resource corresponding to each TRP TX beam (e.g., each of the TRP beams selected by the UE) when the UE has beam correspondence, and multiple uplink time frequency resources for each of the TRP's beams when the UE doesn't have beam correspondence. The UE may then send the beam management reference signals according to the uplink beam management configuration parameters. The TRP may then select one or more of the UE's beams, and send a control signal to the UE indicating the selected UE beams. In the case of multiple time frequency resource, different resource may have the same frequency allocation but with different time allocation, or the same time allocation but with different frequency allocation, or different time and different frequency allocation. In the case of UE doesn't have beam correspondence, the UE may also recommend the TRP the number of resources to be allocated for uplink UE transmit beam sweeping.

Embodiments of this disclosure provide uplink beam management schemes when the UE is in the active state. When the UE is in the active mode, the TRP and UE may maintain a set of active TRP beams, and as a result, the TRP may assign beam management configuration parameters without waiting for the UE to report TRP TX beam related information. As necessary, either TRP or UE may trigger the uplink beam management. The beam management configuration parameters assigned by TRP may include a set of UE-specific SRS or DMRS sequences for each beam in the set of active TRP beams, as well as one or more resources (e.g., time-frequency resources, etc.) for each beam in the set of active TRP beams. The UE may then send uplink beam-management reference signals based on the beam management configuration parameters. The TRP may then select one or more UE beams, and notify the UE of the selected UE beams. Other examples are also possible. These and other aspects are described in greater detail below.

FIG. 1 is a network 100 for communicating data. The network 100 comprises a transmit/receive point (TRP) 110 having a coverage area 101, a plurality of UEs 120, and a backhaul network 130. As shown, the network TRP 110 establishes uplink (dashed line) and/or downlink (dotted line) connections with the UEs 120, which serve to carry data from the UEs 120 to the network TRP 110 and vice-versa. Data carried over the uplink/downlink connections may include data communicated between the UEs 120, as well as data communicated to/from a remote-end (not shown) by way of the backhaul network 130. As used herein, the term "transmit/receive point (TRP)" refers to any component (or collection of components) configured to provide wireless access to a network, such as a base station (BS), an enhanced Node B (eNB), a macro-cell, a femtocell, a Wi-Fi access point (AP), or other wirelessly enabled devices. Network TRPs may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "user equipment (UE)" refers to any component (or collection of components) capable of establishing a wireless connection with a network TRP, such as a mobile device, a mobile station (STA), and other wirelessly enabled devices. In some embodiments, the network 100 may comprise various other wireless devices, such as relays, low power nodes, etc.

Figure 2:
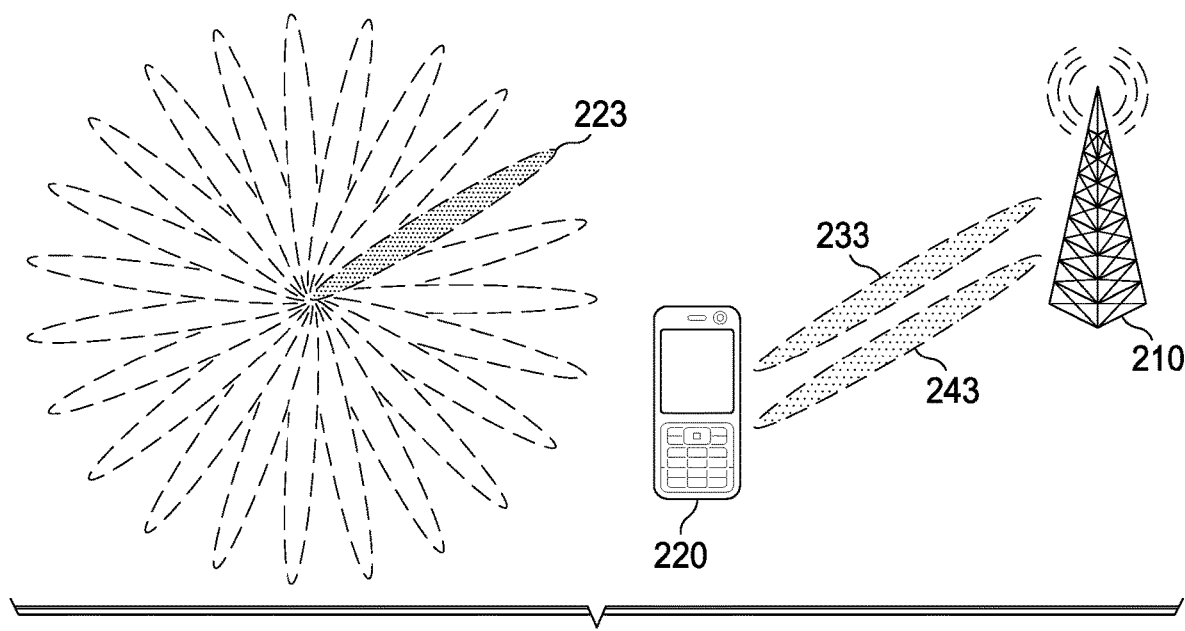
FIG. 2 is a diagram of beamformed transmissions between a UE and a base station.

FIG. 2 is a diagram of beamformed signals 233, 243 being communicated between a TRP 210 and a UE 220. As shown, the UE 220 transmits the beamformed signal 233 to the TRP 210 using the beam direction 223, and receives the beamformed signal 243 from the TRP 210 using the beam direction 223. In some implementations, the beam direction 223 may produce different TX and RX antenna patterns due to non-ideal performance characteristics of analog beamforming components in the UE 220.

Figure 3:
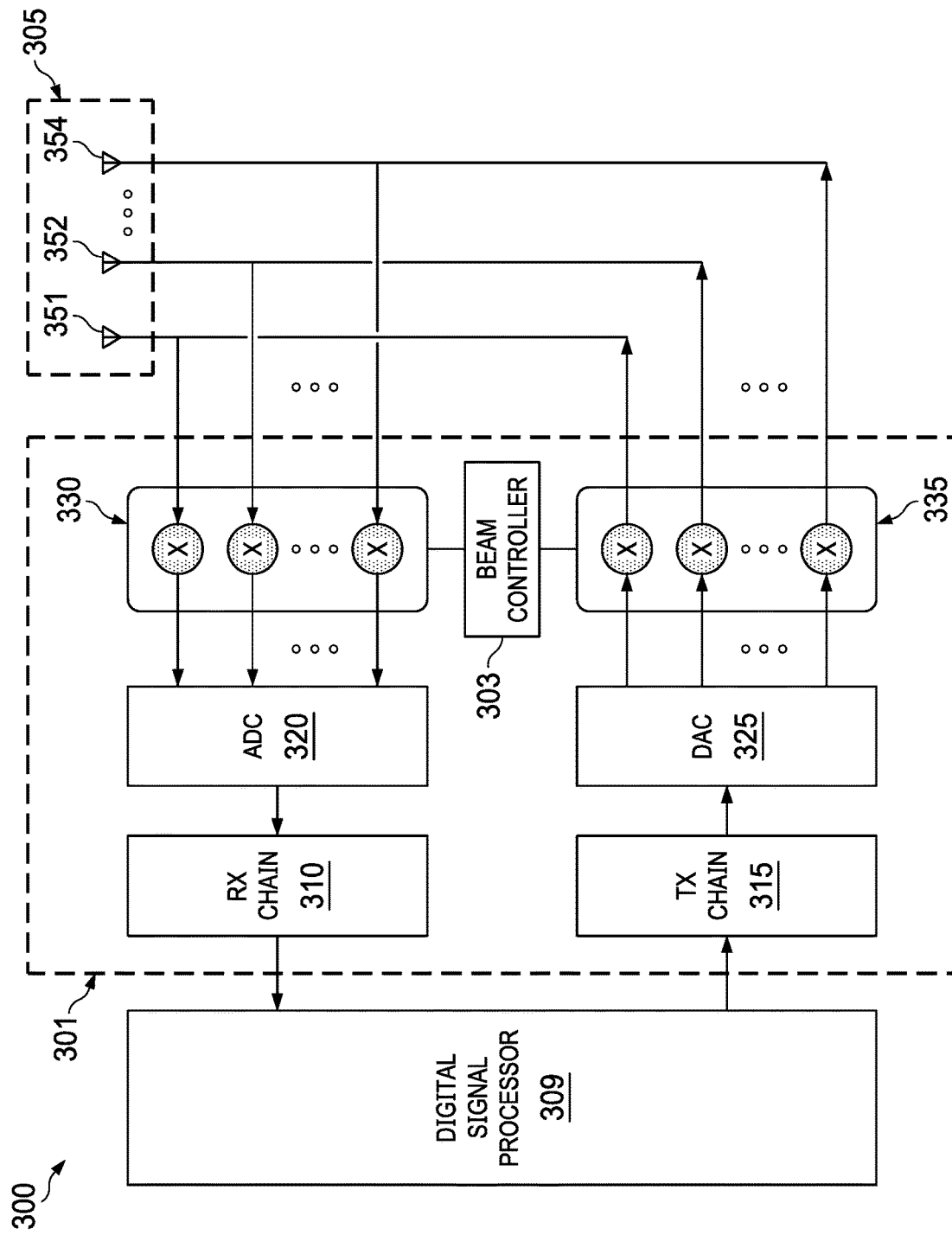
FIG. 3 is a diagram of an embodiment transceiver configured to transmit and receive beamformed signals.

FIG. 3 is a diagram of a transceiver 300 configured for beamformed signal transmission and reception. As shown, the transceiver 300 includes a TX/RX chain 301, an antenna array 305, and a digital signal processor 309. The TX/RX chain 301 includes a beam controller 303, a digital RX chain 310, a digital TX chain 315, an analog to digital (ADC) converter 320, a digital to analog converter (DAC) 325, a set of RX analog beamforming components 330, and a set of TX analog beamforming components 335. The antenna array 305 includes antenna elements 351, 352, 354.

In regards to wireless reception, the antenna array 305 converts a wireless signal into an analog radio frequency (RF) signal. The set of RX beamforming components 330 adjust phase components of the analog RF signal to effectuate directional reception. The analog RF signal is then converted to a digital RF signal by the ADC 320. The digital RF signal is then converted into a baseband signal by the RX chain 310, and the baseband signal is processed by the digital signal processor 309.

In regards to wireless transmission, the TX chain 315 converts a baseband signal generated by the digital signal processor 309 into a digital RF signal, which is converted into an analog RF signal by the DAC 325. The set of TX beamforming components 335 adjust phase components of the analog RF signal to effectuate directional transmission prior to emission of the analog RF signal over the antenna array 305. The beam controller 303 configures a beam direction for the RX antenna and the TX antenna by setting beamforming weights for the set of RX beamforming components 330 and the set of TX beamforming components 335, respectively. Due to non-ideal performance characteristics of the primary RX and TX beamforming components 330, 335, different RX and TX antenna patterns may result when the same beam direction is configured for during wireless reception and wireless transmission.

Figure 4:
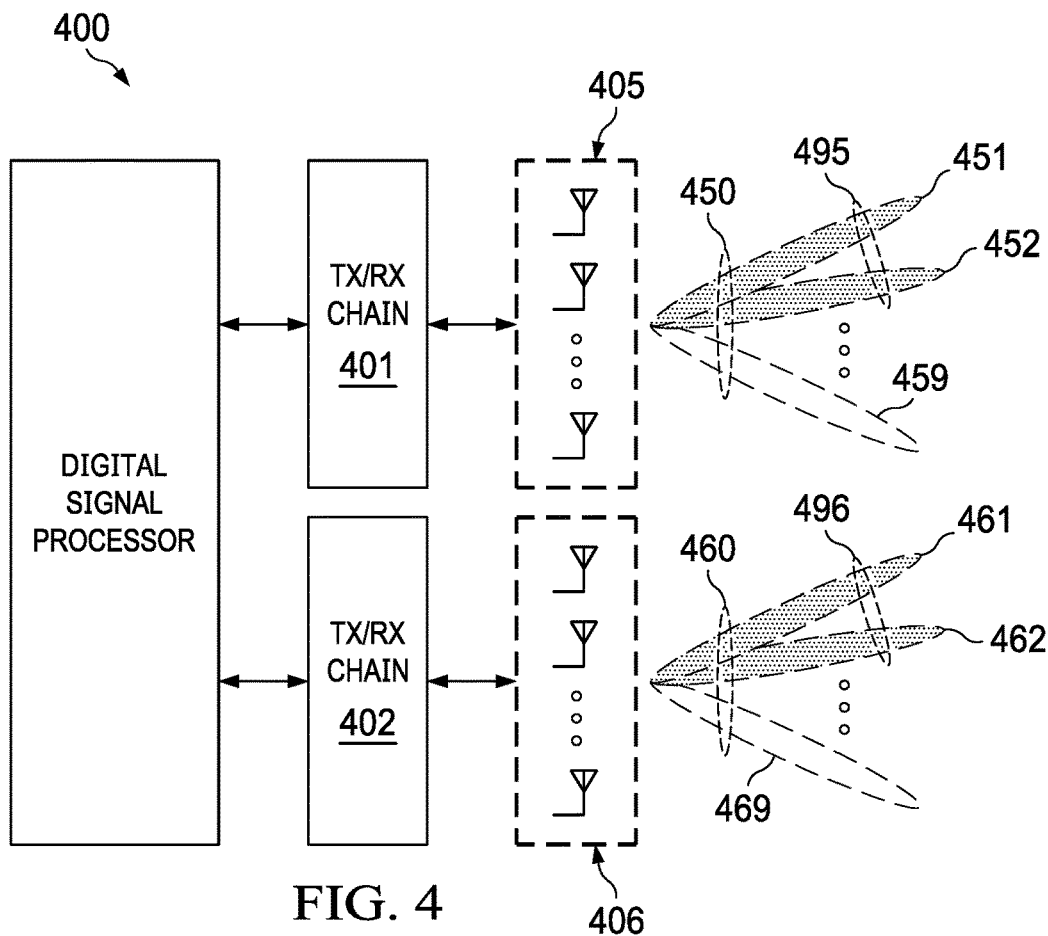
FIG. 4 is another diagram of an embodiment transceiver configured to transmit and receive beamformed signals.

In some embodiments, a UE and/or transceiver may include multiple TX/RX chains associated with different antenna arrays. FIG. 4 is a diagram of a transceiver 400 configured to transmit and receive beamformed signals using different TX/RX chains. As shown, the transceiver 400 includes a TX/RX chain 401 coupled to an antenna array 405, and a TX/RX chain 402 coupled to an antenna array 406. In this example, the TX/RX chain 401 is capable of transmitting and receiving signals over the antenna array 405 using a set of beam directions 450 that includes beam directions 451-459, and the TX/RX chain 401 is capable of transmitting and receiving signals over the antenna array 406 using a set of beam directions 460 that includes beam directions 461-469. The antenna arrays 405, 406 may be located far enough away from one another such that they are not "co-located" with one another, meaning that the antenna arrays will generally yield different spatial performance characteristics depending on the orientation and/or position of the device with respect to the transmit/receive point (TRP). For example, the antenna arrays 405, 406 may be located on opposite ends of a UE housing the transceiver 400, e.g., one antenna array located near the top of the device and another antenna array located near the bottom of the device. Accordingly, the sets of beam directions 450, 460 may be considered mutually exclusive in so far as each beam direction in the set of beam direction 450 may generally provide a different level of spatial performance than each beam direction in the set of beam direction 460 due to the relative positioning of the antenna arrays 405, 406.

In an embodiment, the transceiver 400 receives downlink reference signals over each beam direction in the respective sets of beam directions 450, 460, and selects a corresponding group of beam directions 495, 496 that have the highest received signal quality or received signal power level. In this example, the group of beam directions 495 includes beam directions 451, 452, and the group of beam directions 496 includes beam directions 461, 462. The transceiver 400 then transmits a dynamic UE capability message to a TRP that indicates a number of beam directions in the respective groups of beam directions 495, 496 and the associated TRP beam directions. The dynamic UE capability message may also specify a beam index for each beam direction in the respective groups of beam directions 495, 496. In one embodiment, the dynamic UE capability message may request that a specific set of SRS resources be assigned to the respective groups of beam directions 495, 496. In some embodiments, the dynamic UE capability message may associate each group of UE TX beams with one or more TRP beams. This may allow the TRP to receive SRS transmissions over the respective UE TX beams using a specific TRP RX beam, thereby improving beam management efficiency as well as the accuracy of the estimated channel response.

Upon receiving the dynamic UE capability message, the TRP may assign SRS resources and/or schedule a multi-layer MIMO uplink transmission according to a UE capability constraint. In one embodiment, the UE capability constraint restricts the assignment of SRS resources by requiring that SRS resources assigned to beam directions in the same group of beam directions be orthogonal in the time domain such the SRS transmissions over different beam directions in a given group of beam directions are time division multiplexed with one another. By way of example, SRS resource(s) assigned to the beam direction 451 may be required to span different time-domain resources than SRS resource(s) assigned to the beam direction 452. In this way, SRS transmissions over beam directions 451, 452 may be time division multiplexed with one another. Likewise, SRS resource(s) assigned to the beam direction 461 may be required to span different time-domain resources than SRS resource(s) assigned to the beam direction 462 such that SRS transmissions over beam directions 451, 452 are time division multiplexed with one another.

Notably, there may be no such restriction for beam directions in different groups. By way of example, the beam direction 451 and the beam direction 462 may be assigned SRS resources that overlap in the time domain, but are orthogonal in the frequency domain or the code domain, without violating the UE capability constraint. In this way, SRS transmissions over the respective beam directions 451, 462 may be frequency division multiplexed or code division multiplexed.

The UE capability constraint may also restrict the scheduling of uplink transmissions by preventing multiple beam directions in the same group of beam directions from being scheduled to the same multi-layer MIMO uplink transmission of the UE. For example, the UE capability constraint may restrict the beam directions 451, 452 from being scheduled to the same multi-layer MIMO uplink transmissions by the transceiver 400. The UE capability constraint may provide no such restriction for beam directions in different groups. For example, the beam directions 451, 462 may be scheduled to the same multi-layer MIMO uplink transmission without violating the UE capability constraint.

In some embodiments, multiple TX/RX chains are connected to the same antenna array, in which case the UE may be capable of simultaneously transmitting signals over multiple beam directions in the same group of beam directions. In such embodiments, the UE capability constraint may restrict the number of UE TX beam directions, within a given group of UE TX beam directions, that can be either be used for simultaneous SRS transmissions or otherwise scheduled to the same multi-layer MIMO uplink transmission.

It should be appreciated that associations between SRS transmissions and groups of UE TX beam directions may be identified based on the resources over which the SRS transmissions are received and/or the SRS sequences carried by the SRS transmissions. In one example, the group of beam directions 450 is assigned a different set of SRS resources than the group of beam directions 460. In such an example, the TRP may identify which group of beam directions 450, 460 is associated with a received SRS transmission based on the SRS resource over which the SRS transmission was received. In such an example, SRS transmissions over beam directions in the group of beam directions 450 may carry the same SRS sequence, or a different SRS sequence, as SRS transmissions over beam directions in the group of beam directions 460. In another example, the group of beam directions 450 is assigned a different SRS sequence than the group of beam directions 460, and the TRP identifies which group of beam directions 450, 460 is associated with a received SRS transmission based on the SRS sequence carried by the SRS transmission.

Figure 5:
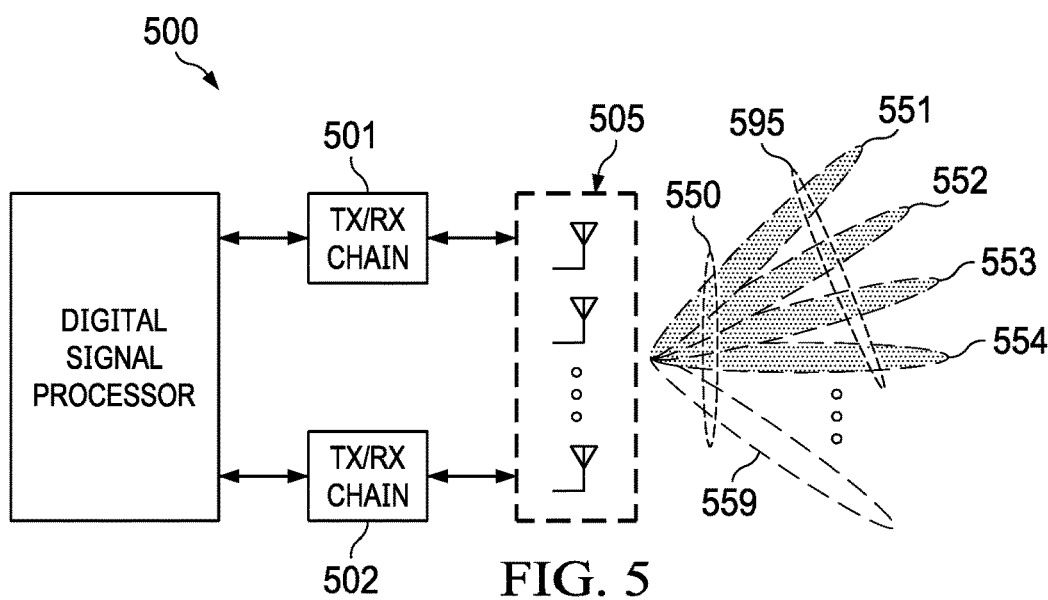
FIG. 5 is another diagram of an embodiment transceiver configured to transmit and receive beamformed signals.

FIG. 5 is a diagram of a transceiver 500 configured to transmit and receive beamformed signals using multiple TX/RX chains. As shown, the transceiver 500 includes TX/RX chains 501, 502 coupled to an antenna array 505. A set of beam directions 550 that includes beam direction 551-559 is associated with the antenna array 505. Because two TX/RX chains 501, 502 are coupled to the antenna array 505, the transceiver 500 is capable of simultaneously transmitting signaling over two beam directions in the set of beam directions 550.

In an embodiment, the transceiver 500 receives downlink reference signals over each beam direction in the set of beam directions 550, and selects a corresponding group of beam directions 595 that have the highest received signal quality or received signal power level. The group of beam directions 595 includes beam directions 551, 552, 553. Upon selecting the group of beam directions 595, the transceiver 500 may transmit a dynamic UE capability message to a TRP that indicates a number of beam directions in the group of beam directions 595. The TRP may then assign SRS resources and/or schedule a multi-layer MIMO uplink transmission according to a UE capability constraint. The UE capability constraint may dictate that no more than two beam directions in the group of beam directions 595 can be used for simultaneous SRS transmissions or otherwise scheduled to a multi-layer MIMO uplink transmission.

In one embodiment, the TRP may assign SRS resources to the beam directions 551, 552 that are non-orthogonal in the time-domain, as well as assign to the beam directions 553, 554 SRS resources that are non-orthogonal in the time-domain with one another. In such an embodiment, an SRS transmission over the beam direction 551 may be frequency division multiplexed or code division multiplexed with an SRS transmission over the beam direction 552, and an SRS transmission over the beam direction 553 may be frequency division multiplexed or code division multiplexed with an SRS transmission over the beam direction 554. Likewise, in such an embodiment, the TRP may assign SRS resources to the beam directions 551, 552 that are orthogonal in the time domain with SRS resources assigned to the beam directions 553, 554 such that SRS transmissions over the beam direction 551, 552 are time division multiplexed with SRS transmissions over the beam direction 553, 554. Other examples are also possible.

Although the transceiver 500 is depicted as having two TX/RX chains 501, 502 connected to the antenna array 505, it should be appreciated that embodiment transceivers may have any number of TX/RX chains connected to a given antenna array, and that the number of TX/RX chains connected to a given array may be used to determine how many beam directions in a given group are permitted to be used for simultaneous SRS transmissions or otherwise scheduled to a common multi-layer MIMO uplink transmission by the UE capability constrain. By way of example, if a given antenna array is connected to three TX/RX chains, then the UE capability constraint may allow up to three beam directions to be used simultaneous SRS transmissions or otherwise scheduled to a multi-layer MIMO uplink transmission.

Figure 6:
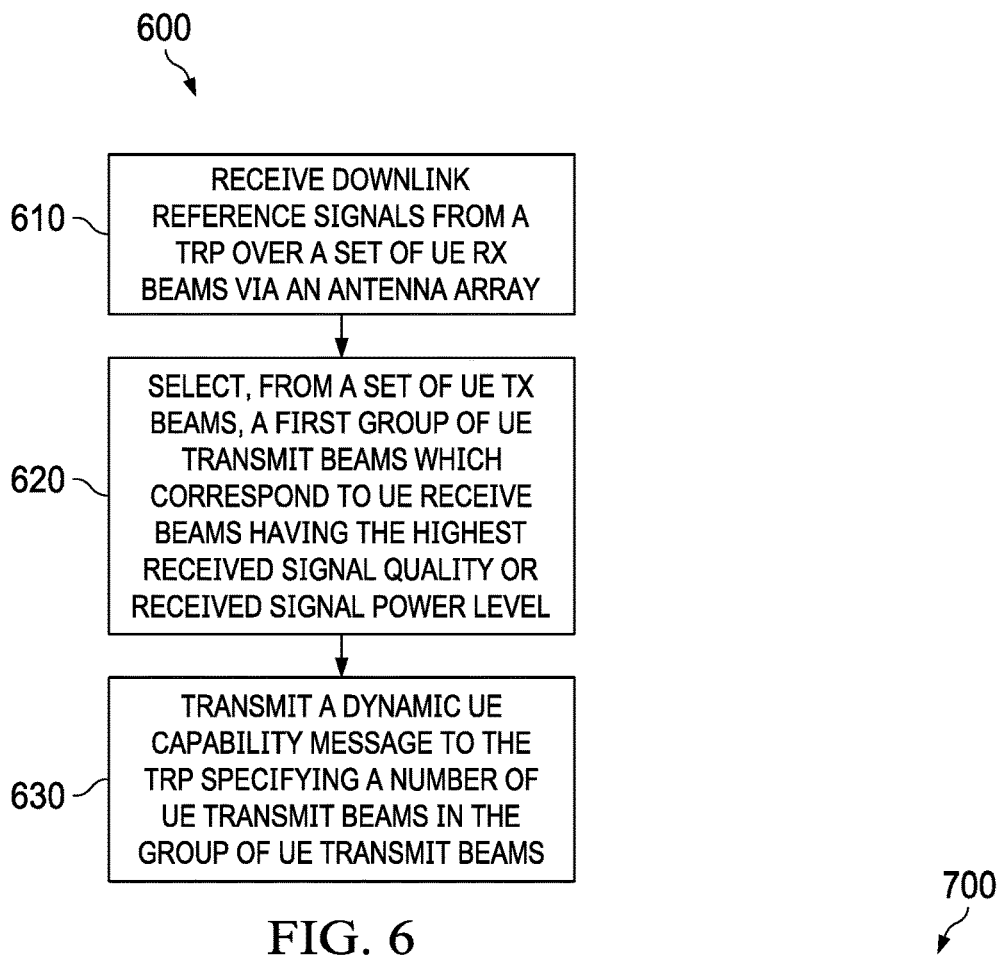
FIG. 6 is a flowchart of an embodiment method for selecting beam directions for uplink transmission.

FIG. 6 is a flowchart of an embodiment method 600 for selecting beam directions for uplink transmission, as may be performed by a UE. At step 610, the UE receives downlink reference signals from a TRP over a set of UE RX beams via an antenna array. In doing so, the UE may measure a received signal quality or power level for each of the UE RX beams, such as a signal to noise ratio (SNR), a signal to noise plus interference ratio (SNIR), a reference signal received quality (RSRQ), and/or a reference signal received power level (RSRP). At step 620, the UE selects, from a set of UE TX beams, a first group of UE TX beam directions that correspond to UE receive beams having the highest received signal quality or received signal power level. At step 630, the UE transmits a dynamic UE capability message to the TRP specifying a number of UE TX beam directions in the group of UE TX beam directions. In some embodiments, the dynamic UE capability message further specifies a beam index (e.g., a channel state information (CSI) reference signal (CSI-RS) resource indicator (CRI), etc.) for each UE transmit beam in the group of UE TX beam directions. In such embodiments, the dynamic UE capability message may also indicate a received signal quality or power level associated with each beam index, e.g., an indication of the SNR, SNIR, RSRQ, and/or RSRP measurement of the UE RX beam associated with the corresponding UE TX beam identified by the beam index. Alternatively, the signal quality indications may be communicated separately from the dynamic UE capability message. The dynamic UE capability message may also request that a specific set of SRS resources be assigned to the group of UE transmit beam directions.

Figure 7:
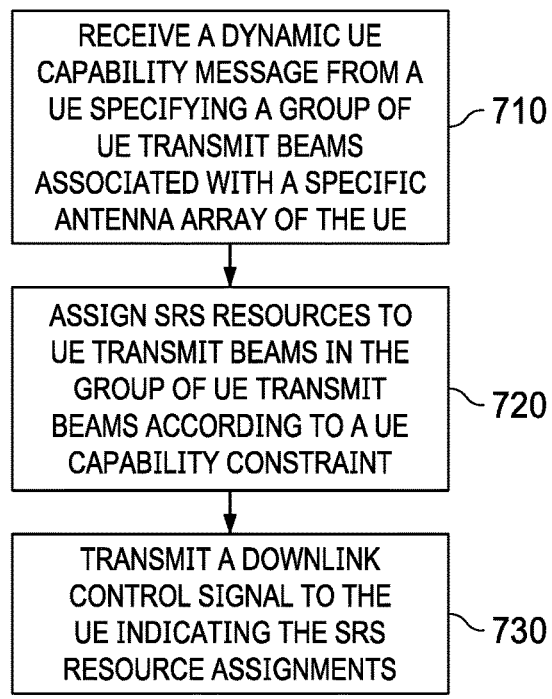
FIG. 7 is a flowchart of an embodiment method for assigning sounding reference signal (SRS) resources according to a user equipment (UE) capability constraint.

Embodiments of this disclosure assign SRS resources to UE TX beam directions according to a UE capability constraint. FIG. 7 is a flowchart of an embodiment method 700 for assigning SRS resources according to a UE capability constraint, as may be performed by a TRP. At step 710, the TRP receives a dynamic UE capability message from a UE specifying a group of UE TX beams associated with a specific antenna array of the UE. At step 720, the TRP assigns SRS resources to UE TX beam directions in the group of UE TX beam directions according to a UE capability constraint. The UE capability constraint may restrict the number of UE transmit beam directions in the group of UE transmit beam directions that can be used for simultaneous SRS transmissions. As an example, if a single TX/RX chain is connected to the corresponding antenna array of the UE, then the UE capability constraint may require that SRS resources assigned to UE TX beam directions in the group of UE TX beam directions be orthogonal in the time domain such the SRS transmissions over different UE TX beam directions in the group of UE TX beam directions are time division multiplexed with one another. As another example, if multiple TX/RX chains are connected to the corresponding antenna array of the UE, then the number of UE TX beam directions that are permitted to be used for simultaneous SRS transmission by the UE capability constraint may be equal to the number TX/RX chains that are connected to the antenna array of the UE. At step 730, the TRP transmits a downlink control signal to the UE indicating the SRS resource assignments.

Figure 8:
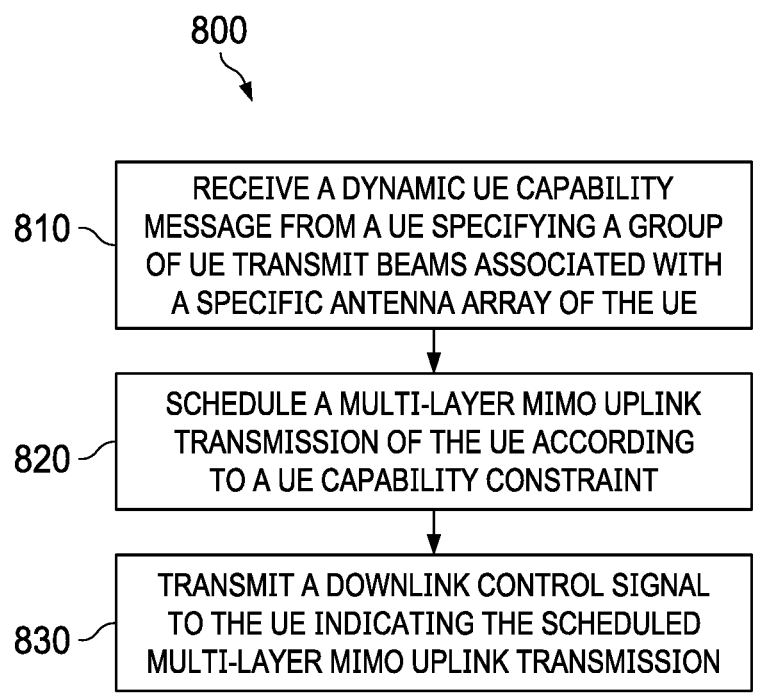
FIG. 8 is a flowchart of an embodiment method for scheduling a multi-layer multiple input multiple output (MIMO) uplink transmission according to a UE capability constraint.

Embodiments of this disclosure schedule multi-layer MIMO uplink transmissions according to a UE capability constraint. FIG. 8 is a flowchart of an embodiment method 800 for scheduling multi-layer MIMO uplink transmissions according to a UE capability constraint, as may be performed by a TRP. At step 810, the TRP receives a dynamic UE capability message from a UE specifying a group of UE TX beams associated with a specific antenna array of the UE. At step 820, the TRP schedules a multi-layer MIMO uplink transmission of the UE according to a UE capability constraint. The UE capability constraint may restrict the number of UE transmit beam directions in the group of UE transmit beam directions that can be scheduled to the same multi-layer MIMO uplink transmission of the UE. For instance, if a single TX/RX chain is connected to the corresponding antenna array of the UE, then the UE capability constraint may prevent multiple UE TX beam directions from the group of UE TX beam directions from being scheduled to the same multi-layer MIMO uplink transmission of the UE. Alternatively, if multiple TX/RX chains are connected to the corresponding antenna array of the UE, then the number of UE TX beam directions that are permitted to be scheduled to a given multi-layer MIMO uplink transmission by the UE capability constraint may be equal to the number TX/RX chains that are connected to the antenna array of the UE. At step 830, the TRP transmits a downlink control signal to the scheduled multi-layer MIMO uplink transmission.

In new radio (NR), precoded SRS transmissions may be used for high frequency (HF) communication. Precoded SRS transmissions may be used for beam management as well as channel acquisition. In NR HF, a UE may be equipped with multiple antenna panels and TX/RX chains, and the UE TX beams that can be used simultaneously may be subject to specific UE capability parameters. Different UEs may have different beamforming capabilities/configurations. For example, UEs may have different numbers of antenna panels/arrays, different numbers of TX/RX chains, and/or different numbers and/or types of connections between TX/RX chains and antenna panels/arrays.

Different types of SRS transmissions may have different duty cycles and/or be associated with different periodic intervals. For example, an SRS transmission for uplink beam management may be associated with a longer periodic interval (e.g., be transmitted less frequently) than an SRS transmission for channel estimation, e.g., an SRS transmission used to generate channel state information (CSI) for digital and/or analog antenna ports. A TRP may use information carried in static and/or dynamic UE capability messages for SRS resource assignments and/or uplink scheduling. For example, the TRP may use said information to determine UE capability constraints for multiplexing analog and/or digital beams, beam/antenna port selection, rank in each analog beam, linear combination across beams/antenna ports, etc. A static UE capability message may be communicated from a UE to a TRP during initial access. A dynamic UE capability message may be communicated after the UE has received one or more downlink reference signals. In some embodiments, dynamic UE capability messages are fed back periodically or aperiodically over the course of the communications session.

A static UE capability message may specify a number of antenna panels/arrays, a total number of TX/RX chains available to the UE, and/or a number of TX/RX chains per antenna panel/array. A dynamic UE capability message may indicate beam pair links (BPL), as well as convey that different UE TX beam combinations require, or otherwise may benefit from, different SRS resource configurations/assignments.

A static UE capability report is transmitted during an initial access protocol, and indicates a number of beam groups, a number of beams within each beam group, and a highest rank supported within each beam group. The static UE capability report may also indicate a UE beam set ID list (e.g., a list of beam indices) associated with each beam group. A highest rank supported within each beam group may correspond to a number of beams that can be used concurrently, as may be determined by the number of TX/RX chains connected to the corresponding antenna array/panel.

In one embodiment, a UE transmits a dynamic UE capability report to a TRP after the UE receives downlink reference signals, but prior to the assignment of SRS resources for uplink beam management. In such an embodiment, a TRP may allocate SRS resources for each UE beam group based on a number of beams to be evaluated per TRP beam. Different beam groups may be assigned different SRS sequences or time/frequency positions.

In another embodiment, a UE transmits a static UE capability report to a TRP during an initial access procedure (e.g., upon discovering the TRP). The static UE capability report may indicate one or more beam set indices associated with one or more sets of beams, as well as a number of beams within each set of beams, and a highest rank supported by each set of beams. Upon receiving the static UE capability report, the TRP may select a downlink SRS configuration (e.g., a set of SRS resources) for each UE beam set after receiving the static UE capability report during an initial access protocol, and sends a message indicating the selected downlink SRS configuration to the UE. Thereafter, the UE selects, from a corresponding set of UE TX beams, a group of UE TX beams based on the quality/power levels associated with UE RX beams used to receive the downlink transmissions. The UE may then send a dynamic UE capability report to the TRP that indicates a UE beam set ID associated with the selected UE TX beams, as well as a number of UE TX beams that were selected from the corresponding set of UE TX beams, to the TRP. Upon receiving the dynamic UE capability report, the TRP may assign uplink SRS resources to each beam group. UE dynamic capability report can be periodic or aperiodic and can be triggered by TRP or UE.

In some embodiments, uplink beam management may be performed after downlink beam management. For UEs that have beam correspondence, uplink beam management may be based on channel/spatial reciprocity such that UE TX beams are selected based on received signal quality levels associated with UE RX beams without performing separate uplink SRS transmissions. For UEs that lack beam correspondence, uplink beam management may be based uplink SRS transmissions and/or uplink physical random access channel (PRACH) preamble transmissions. In general, PRACH preamble transmissions may be performed during the initial access stage, while SRS transmissions may be performed during the UE connected mode.

In some embodiments, UEs may select beamforming directions, or precoders, from a codebook when transmitting and/or receiving beamformed transmissions. In general, a codebook is a set of predefined beam directions (referred to as codewords) that can be used for directional transmission and reception. In other embodiments, UEs may dynamically create/adjust UE TX beam directions using, for example, Eigen-based beamforming (EBB) techniques, which may include adjusting analog and/or digital beamforming parameters based on a channel impulse response estimated from downlink reference signals. In such embodiments, UE TX beam directions may be fine-tuned using uplink beam management techniques.

Due to spatial reciprocity, a beam used by a device to transmit a signal will generally offer similar levels of spatial performance when used by the device to receive a signal. However, the non-ideal characteristics of the analog beamforming components may cause the antenna pattern of a transmit (TX) beam to differ from the antenna pattern of a corresponding receive (RX) beam. That is to say, the same set of analog beamforming weights may generate a different antenna pattern when applied to the analog TX chain than when applied to the analog RX chain. Beamforming calibration techniques are therefore needed to compensate for non-ideal characteristics of the analog beamforming components on the analog TX and RX chains.

Figure 9:
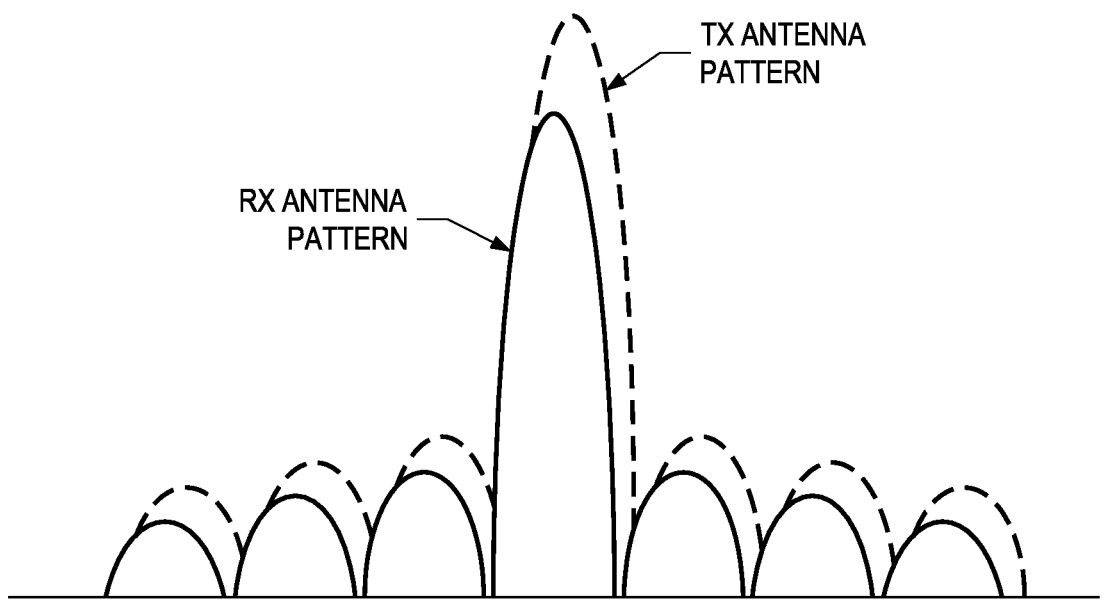
FIG. 9 is a graph of antenna diagrams for TX and RX reference signals transmitted and received according to the same beam.

FIG. 9 is a graph of TX and RX antenna patterns corresponding to the beam 223 used to transmit and receive the reference signals as depicted in FIG. 2. In this example, the primary and secondary lobes of the TX and RX antenna have different borescopes. In other examples, the primary and secondary lobes of the TX and RX antenna may have different beamwidths. One or both of these conditions may affect antenna gain, or otherwise cause TX signals and RX signals transmitted/received according to the beam 223 to exhibit different quality parameters upon reception.

After receiving the TX reference signal 233, the TRP 210 sends a quality parameter corresponding to the TX reference signal 233 to the UE 220. The UE compares the quality parameter corresponding to the TX reference signal 233 with a quality parameter corresponding to the RX reference signal 243. When the difference between the respective quality parameters exceeds a threshold, the UE 220 calibrates analog beamforming components on the TX and/or RX antenna.

It should be appreciated that beam calibration may be performed by transmitting and receiving reference signals over a single beam, or over multiple beams at the same time, or in the same calibration session. For example, the UE 220 may receive RX reference signals over two or more beams, transmit TX reference signals over those two or more beams, and then compare quality parameters of the respective pairs of TX and RX reference signals (e.g., TX and RX reference signals corresponding to the same beam) to determine whether beamforming components needs to be adjusted for any of the beams. In some embodiments, the TRP 210 may transmit a query of beam calibration status to the UE 220. The query may request that the UE 220 acknowledges whether the calibration of one or more beams satisfies one or more criteria. In one example, the calibration of a given beam satisfies a criterion when a difference between the TX and RX reference signal quality levels is less than a threshold. The UE 220 may then send a response to the TRP 210 that indicates whether the calibration of the one or more beams was successful.

Figure 10:
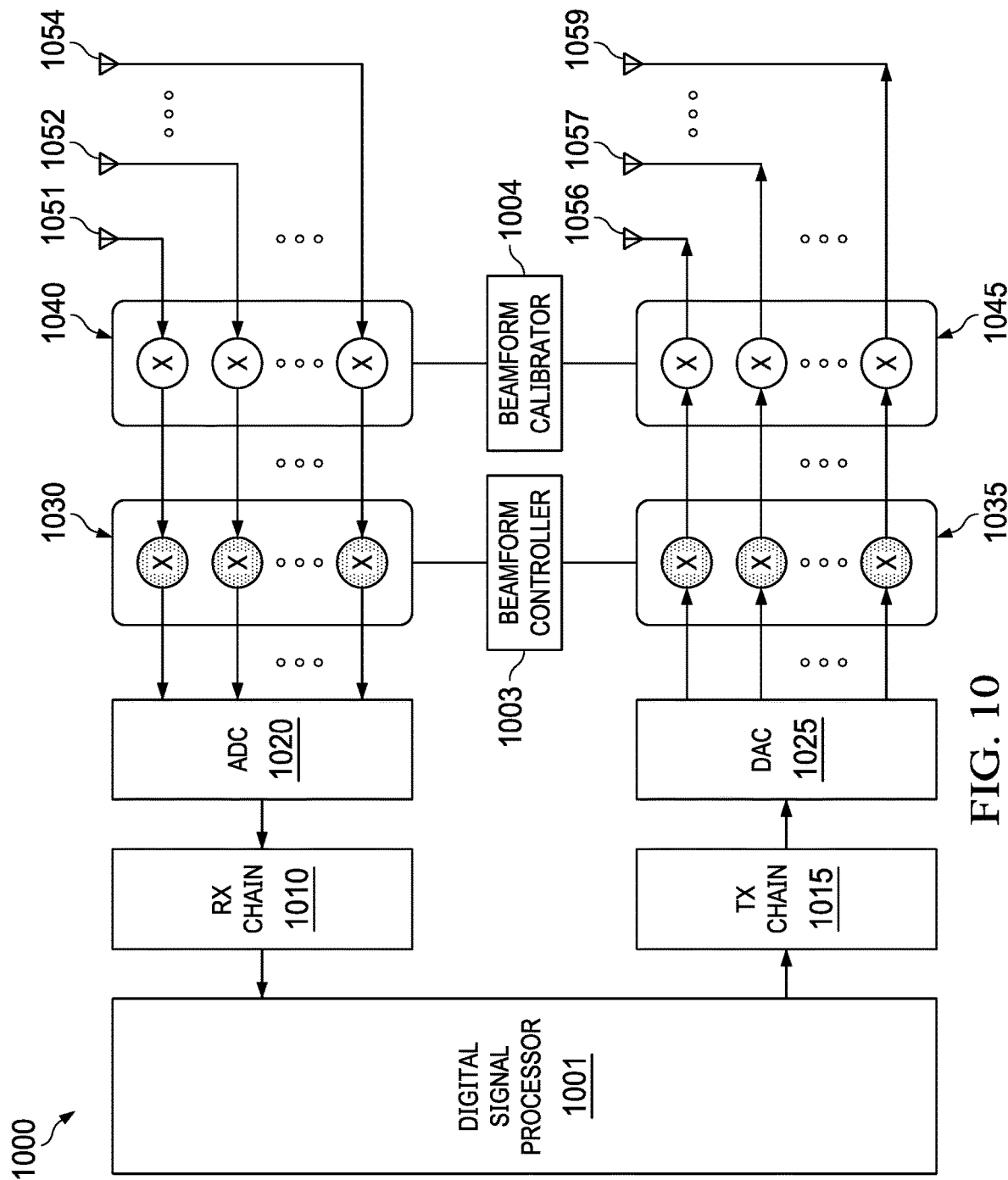
FIG. 10 is a diagram of an embodiment transceiver configured for beam calibration.

FIG. 10 is a diagram of a transceiver moo configured for beam calibration. As shown, the transceiver 1000 includes a digital signal processor 1001, a beamform controller 1003, and beamform calibrator 1004, a digital RX chain 1010, a digital TX chain 1015, an analog to digital (ADC) converter 1020, a digital to analog converter (DAC) 1025, a set of primary RX beamforming components 1030, a set of primary TX beamforming components 1035, a set of secondary RX beamforming components 1040, a set of secondary RX beamforming components 1045, a set of RX antenna elements 1051, 1052, 1054, and a set of TX antenna elements 1056, 1057, 1058.

In regards to wireless reception, the RX antenna elements 1051, 1052, 1054 collectively form an RX antenna that converts a wireless signal into an analog radio frequency (RF) signal. The primary and secondary RX beamforming components 1030, 1040 adjust phase components of the analog RF signal to effectuate directional reception. The analog RF signal is then converted to a digital RF signal by the ADC 1020. The digital RF signal is then converted into a baseband signal by the RX chain 1010, and the baseband signal is processed by the digital signal processor 1001.

In regards to wireless transmission, the TX chain 1015 converts a baseband signal generated by the digital signal processor 1001 into a digital RF signal, which is converted into an analog RF signal by the DAC 1025. The primary and secondary TX beamforming components 1035, 1045 adjust phase components of the analog RF signal to effectuate directional transmission prior to emission of the analog RF signal over the TX antenna elements 1056, 1057, 1058, which collectively form a TX antenna.

The beamform controller 1003 configures a beam for the RX antenna and the TX antenna by setting beamforming weights for the set of primary RX beamforming components 1030 and the set of primary TX beamforming components 1035, respectively. Due to non-ideal performance characteristics of the primary RX and TX beamforming components 1030, 1035, different RX and TX antenna patterns may result when the same beam is configured for the RX and TX antenna of the transceiver 1000. The beamform calibrator 1004 adjusts beamforming weights for the secondary RX and TX beamforming components 1040, 1045 to compensate for the non-ideal performance characteristics of the primary RX and TX beamforming components 1030, 1035. In this way, the secondary RX and TX beamforming components 1040, 1045 are used to mitigates differences in TX and RX antenna patterns corresponding to a given beam. In some embodiments, secondary beamforming components are used for one of the TX or RX antennas but not the other.

In such embodiments, the single set of secondary beamforming components can be used to adjust the corresponding antenna pattern to mitigate difference between that antenna pattern and the other antenna pattern.

In some embodiments, the beamform calibrator 1004 adjusts the beamforming weights for secondary RX/TX beamforming components 1040, 1045 based on a quality parameters associated with TX and RX reference signals. For example, the beamform calibrator 1004 may iteratively adjust the beamforming weights for secondary RX/TX beamforming components 1040, 1045 until a difference between a quality parameter associated with a TX reference signal and a quality parameter associated with an RX reference signal drops below a threshold.

Figure 11:
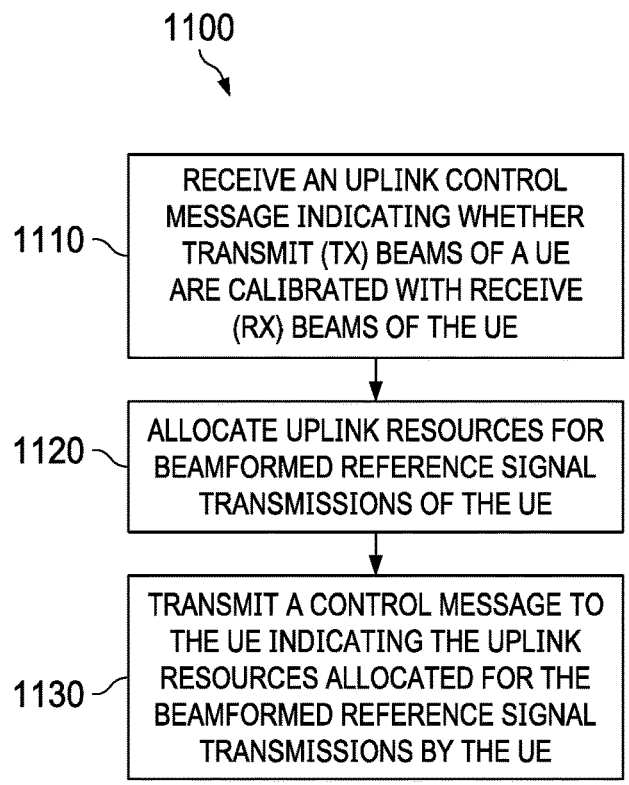
FIG. 11 is a flowchart of an embodiment method for uplink beam management.

FIG. 11 is a flowchart of an embodiment method 1100 for uplink beam management, as may be performed by a TRP. At step 1110, the TRP receives an uplink control message indicating whether transmit (TX) beams of a UE are calibrated with receive (RX) beams of the UE (or in the other word whether UE has beam correspondence). At step 1120, the TRP allocates uplink resources for beamformed reference signal transmissions of the UE. The TRP may allocate a single uplink resource per TRP beam for the beamformed reference signal transmissions of the UE when the UE has beam correspondence. The TRP may allocate multiple uplink resources per TRP beam for the beamformed reference signal transmissions of the UE when the UE doesn't have the beam correspondence. At step 1130, the TRP transmits a control message to the UE to indicate the uplink resources allocated for the beamformed reference signal transmissions by the UE and associated TRP TX beam information. Thereafter, the TRP may receive uplink reference from the UE signals over the uplink resources.

Figure 12:
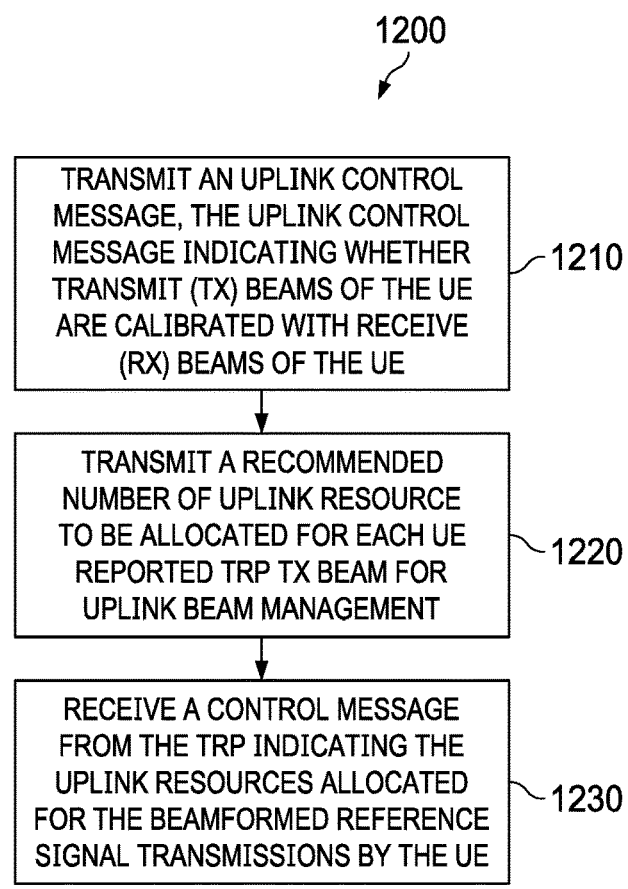
FIG. 12 is a flowchart of another embodiment method for uplink beam management.

FIG. 12 is a flowchart of another embodiment method for uplink beam management, as may be performed by a UE. At step 1210, the UE transmits an uplink control message indicating whether transmit (TX) beams of the UE are calibrated with receive (RX) beams of the UE. At step 1220, the UE transmits a recommended number of uplink resource to be allocated for each UE reported TRP TX beam for uplink beam management. At step 1230, the UE receives a control message from the TRP indicating the uplink resources allocated for the beamformed reference signal transmissions by the UE as well as associated TRP beam information. Thereafter, the TRP may receive uplink reference from the UE signals over the uplink resources.

Figure 13:
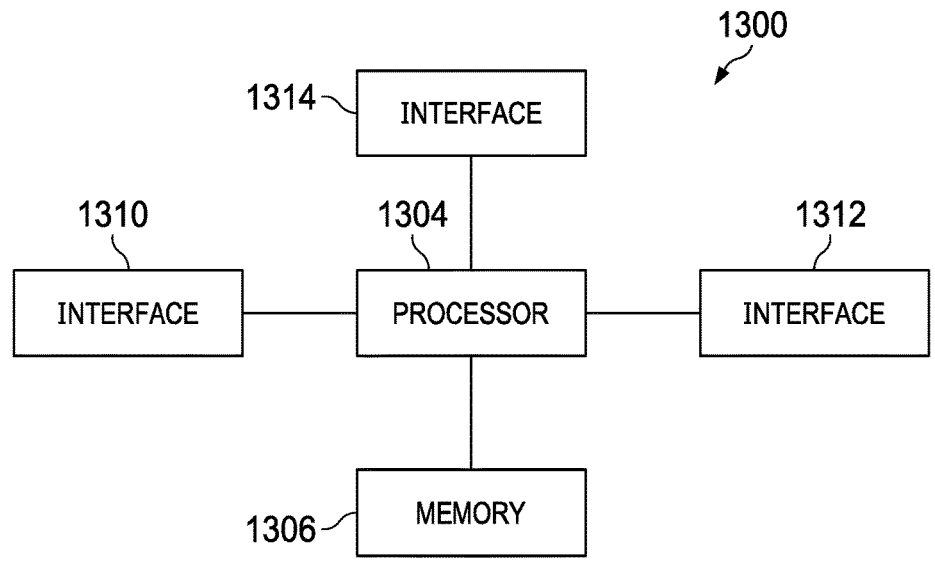
FIG. 13 is a block diagram of an embodiment processing system for performing methods described herein.

FIG. 13 illustrates a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
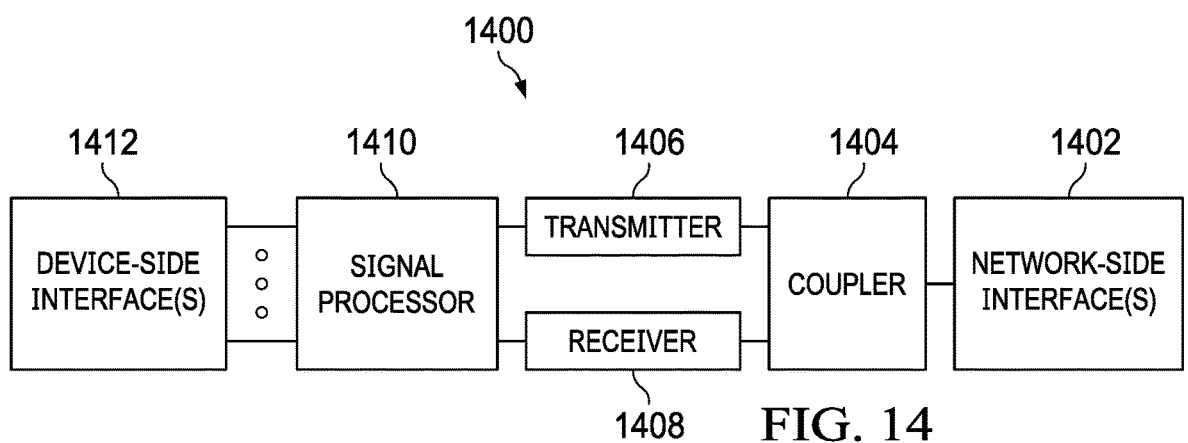
FIG. 14 is a block diagram of a transceiver adapted to transmit and receive signaling over a telecommunications network according to example embodiments described herein.

In some embodiments, one or more of the interfaces 1310, 1312, 1314 connects the processing system 1300 to a transceiver adapted to transmit and receive signaling over the telecommunications network. FIG. 14 illustrates a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for uplink beam management, the method comprising:
    transmitting, by a user equipment (UE), a first uplink control message to a serving transmit receive point (TRP) indicating whether the UE has beam correspondence;
    transmitting, by the UE, a second uplink control message to the serving TRP recommending a number of uplink resources to be allocated for each UE reported TRP transmit (TX) beam for uplink beam management based on whether the UE has beam correspondence, the second uplink control message recommending that a single uplink resource be allocated for each UE reported TRP TX beam when the UE has beam correspondence and recommending that multiple uplink resources be allocated for each UE reported TRP TX beam when the UE lacks beam correspondence; and
    receiving, by the UE, a downlink control message from the serving TRP allocating one or more uplink resources for beamformed reference signal transmissions by the UE.

2. The method of claim 1, wherein the downlink control message includes an indication of a TRP TX beam that is associated with the one or more uplink resources allocated by the downlink control message.

3. The method of claim 1, further comprising:
    transmitting, by the UE, one or more beamformed reference signals over the one or more uplink resources allocated by the downlink control message.

4. A user equipment (UE) comprising:
    a processor; and
    a non-transitory computer readable storage medium storing programming for execution by the processor, the programming including instructions to:
        transmit a first uplink control message to a serving transmit receive point (TRP) indicating whether the UE has beam correspondence;
        transmit a second uplink control message to the serving TRP recommending a number of uplink resources to be allocated for each UE reported TRP transmit (TX) beam for uplink beam management based on whether the UE has beam correspondence, the second uplink control message recommending that a single uplink resource be allocated for each UE reported TRP TX beam when the UE has beam correspondence and recommending that multiple uplink resources be allocated for each UE reported TRP TX beam when the UE lacks beam correspondence; and receive a downlink control message from the serving TRP allocating one or more uplink resources for beamformed reference signal transmissions by the UE.

5. The UE of claim 4, wherein the downlink control message includes an indication of a TRP TX beam that is associated with the one or more uplink resources allocated by the downlink control message.

6. The UE of claim 4, wherein the programming further includes instructions to transmit one or more beamformed reference signals over the one or more uplink resources allocated by the downlink control message.

7. A method for uplink beam management, the method comprising:

receiving, by a serving transmit receive point (TRP), a first uplink control message from a user equipment (UE), the first uplink control message indicating whether the UE has beam correspondence;

receiving, by the serving TRP, a second uplink control message from the UE, the second uplink control message recommending a number of uplink resources to be allocated for each UE reported TRP transmit (TX) beam for uplink beam management based on whether the UE has beam correspondence, the second uplink control message recommending that a single uplink resource be allocated for each UE reported TRP TX beam when the UE has beam correspondence and recommending that multiple uplink resources be allocated for each UE reported TRP TX beam when the UE lacks beam correspondence; and transmitting, by the serving TRP, a downlink control message to the UE, the downlink control message allocating one or more uplink resources for beamformed reference signal transmissions by the UE.

8. The method of claim 7, wherein the downlink control message includes an indication of a TRP TX beam that is associated with the one or more uplink resources allocated by the downlink control message.

9. The method of claim 7, further comprising:

receiving, by the serving TRP, one or more beamformed reference signals over the one or more uplink resources allocated by the downlink control message.

10. A serving transmit receive point (TRP) comprising:
a processor; and
a non-transitory computer readable storage medium storing programming for execution by the processor, the programming including instructions to:

receive a first uplink control message from a user equipment (UE), the first uplink control message indicating whether the UE has beam correspondence;

receive a second uplink control message from the UE, the second uplink control message recommending a number of uplink resources to be allocated for each UE reported TRP transmit (TX) beam for uplink beam management based on whether the UE has beam correspondence, the second uplink control message recommending that a single uplink resource be allocated for each UE reported TRP TX beam when the UE has beam correspondence and recommending that multiple uplink resources be allocated for each UE reported TRP TX beam when the UE lacks beam correspondence; and transmit a downlink control message to the UE, the downlink control message allocating one or more uplink resources for beamformed reference signal transmissions by the UE.

11. The serving TRP of claim 10, wherein the downlink control message includes an indication of a TRP TX beam that is associated with the one or more uplink resources allocated by the downlink control message.

12. The serving TRP of claim 10, wherein the programming further includes instructions to:

receive one or more beamformed reference signals over the one or more uplink resources allocated by the downlink control message.

* * * * *